(12) United States Patent
Watanabe et al.

(10) Patent No.: US 6,680,461 B2
(45) Date of Patent: Jan. 20, 2004

(54) NOZZLE SYSTEM FOR LASER MACHINING

(75) Inventors: Atsushi Watanabe, Tokyo (JP);
Mitsuhiro Okuda, Yamanashi (JP);
Yoshitake Furuya, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 13 days.

(21) Appl. No.: 10/118,978

(22) Filed: Apr. 10, 2002

(65) Prior Publication Data

US 2002/0148821 A1 Oct. 17, 2002

(30) Foreign Application Priority Data

Apr. 11, 2001 (JP) .......................................... 2001/112678

(51) Int. Cl.[7] .............................................. B23K 26/02
(52) U.S. Cl. ............................. 219/121.83; 219/121.78; 219/121.79
(58) Field of Search ....................... 219/121.84, 121.83, 219/121.85, 121.82, 121.78, 121.79

(56) References Cited

U.S. PATENT DOCUMENTS

| | | | | |
|---|---|---|---|---|
| 5,204,517 A | * | 4/1993 | Cates et al. | 250/205 |
| 5,239,552 A | * | 8/1993 | Okuyama et al. | 372/58 |
| 5,293,023 A | * | 3/1994 | Haruta et al. | 219/121.6 |
| 6,040,554 A | * | 3/2000 | Terada et al. | 219/124.34 |

FOREIGN PATENT DOCUMENTS

| | | |
|---|---|---|
| JP | 63-25282 | 2/1988 |
| JP | 06-328283 | 11/1994 |
| JP | 08-206868 | 8/1996 |

* cited by examiner

Primary Examiner—M. Alexandra Elve
(74) Attorney, Agent, or Firm—Staas & Halsey LLP

(57) ABSTRACT

A nozzle system for laser machining capable of maintaining an interference region of a robot in a teaching operation to be substantially the same as that in a laser machining operation. An optical fiber supporting unit is attached to a nozzle body unit having laser beam converging lens for performing a laser machining operation. An optical fiber for supplying a laser beam is connected to an optical fiber connector on the optical fiber supporting unit. A laser machining is performed by combination of the nozzle body unit and the optical fiber supporting member attached to a distal end of a robot arm. In a teaching operation, a camera supporting unit (dummy nozzle) having substantially the same dimension as the nozzle body unit and supporting a camera at a predetermined position is used in place of the optical fiber supporting unit and the nozzle body unit. Alternatively, the nozzle body unit may be used commonly in combination with the optical fiber supporting unit in the machining operation and with the camera supporting unit in the teaching operation. A visual sensor using projection of a spot beam or slit beams may be adopted.

7 Claims, 5 Drawing Sheets

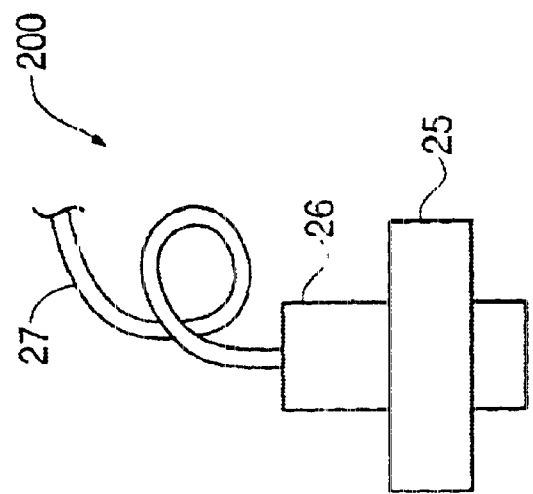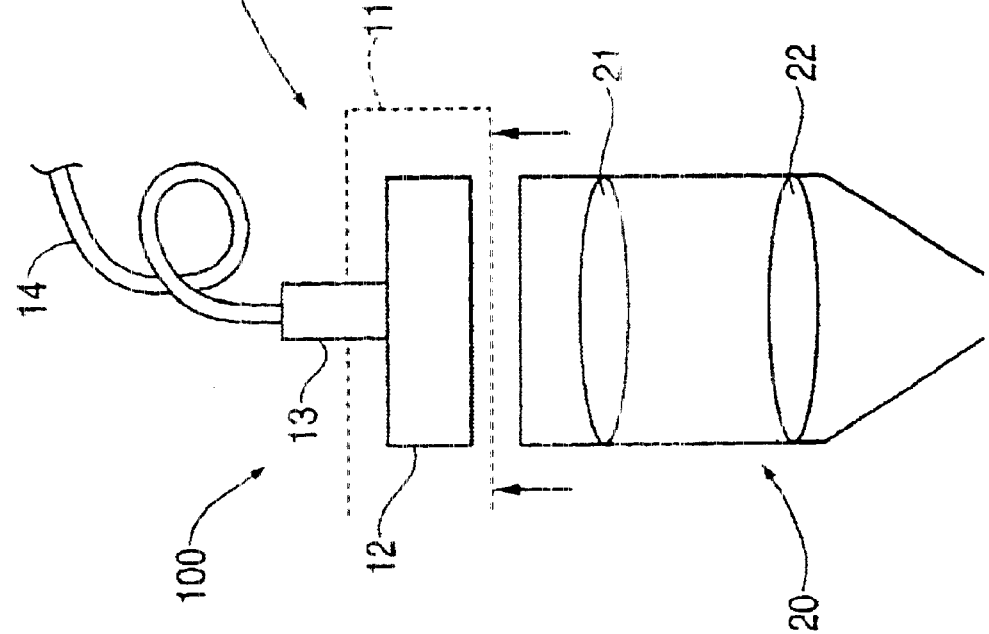

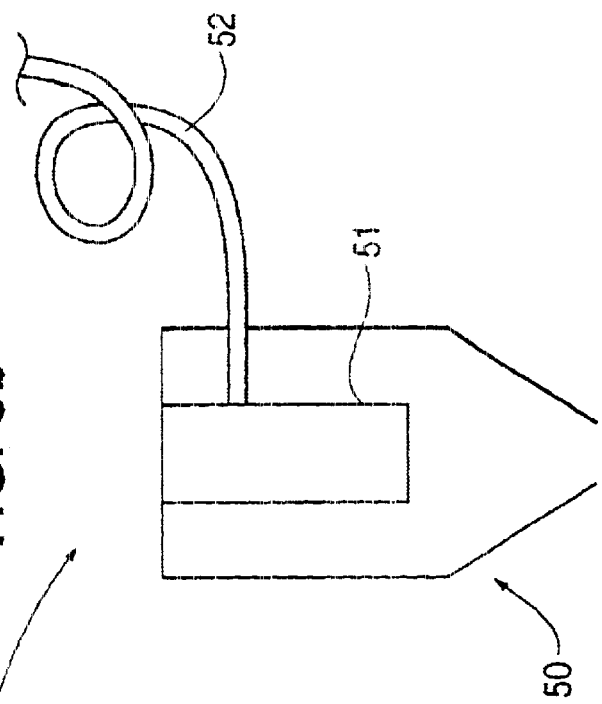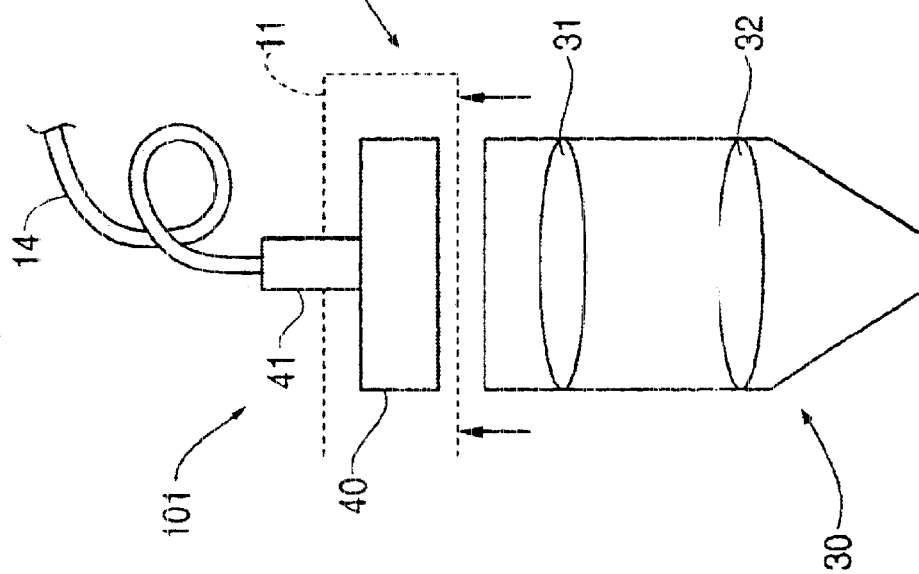

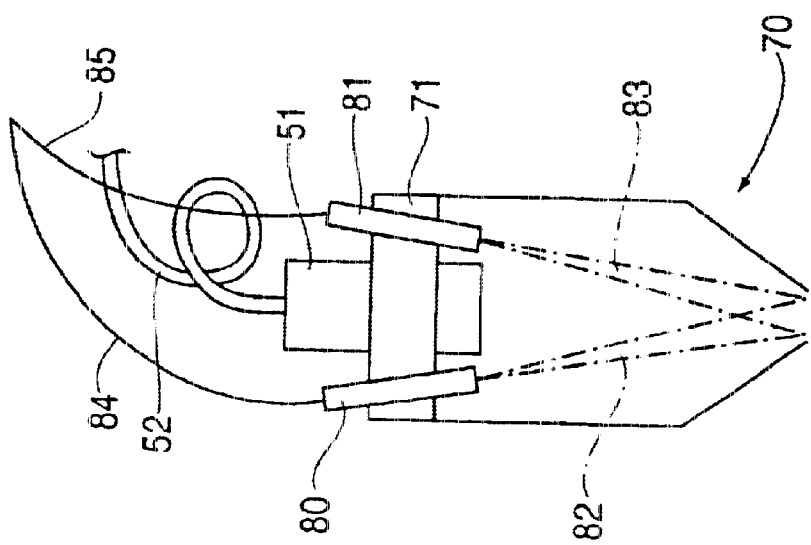
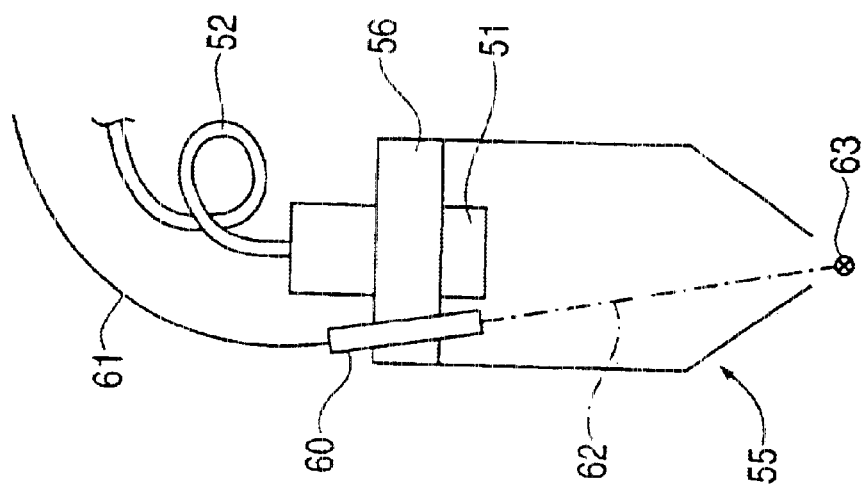

NOZZLE SYSTEM FOR LASER MACHINING

BACKGROUND OF THE INVENTION

1. Field of the Invention

The present invention relates to a nozzle system for laser machining to be attached to an arm of a robot, and in particular to a nozzle system for performing a laser machining operation and a teaching operation to the robot.

2. Description of Related Art

There has been recently arose a need of three dimensional laser machining using a robot in an automobile industry and other industries. However, it is difficult and thus takes a long time to teach a three-dimensional laser machining operation to a robot and thus such laser machining operation tends to be avoided. It is possible to perform an off-line teaching operation using a teaching software, but there probably exists a slight displacement between a position of an imaginary workpiece expressed by positional data in the teaching software and a position of a real workpiece in actual machining because of a dimensional dispersion of a workpiece, etc.

Therefore, it is necessary to modify and correct the taught data after the off-line teaching operation using the teaching software. It has been proposed a method of determining an operation path using an analysis software for calculating teaching points based on images of a real workpiece captured by a CCD camera attached to a laser machining nozzle, for example as proposed Japanese Patent No. 2822315.

In the above method, there arises a problem that an operating region of a robot without interference with surroundings is narrowed because of the camera attached to an upper side of the laser machining nozzle. Thus, it is necessary to put further restriction on the operating region of the robot, which is quite cumbersome and lowers efficiency of the teaching operation.

The above problem will be specifically described referring to FIG. 1, which shows a laser machining nozzle as proposed in Japanese Patent No. 2822315. In FIG. 1, a machining nozzle 1 has a semi-transparent mirror 5 and lenses 6, 7 inside. An optical fiber 2 for supplying a laser beam for machining is connected to the machining nozzle 1 on a lateral side thereof to direct the laser beam to the semi-transparent mirror 5.

The laser beam supplied from the optical fiber 2 is mostly reflected by the semi-transparent mirror 5 arranged inclined at 45 degree with respect to an optical axis 3 (positioned at a center of a core of the optical fiber 2) of the laser beam, and converged by the lens 6 to form a conversing laser beam 4 to be impinged on a workpiece 15, as an object of laser machining.

On the other hand, the camera 18 for capturing images of the workpiece 15 is mounted on an upper side of the machining nozzle 1 so that an optical axis 10 of the camera coincides with the optical axis of the laser beam 4.

The lens 7 is provided for adjusting a lens system comprising the converging lens 6 and the lens 7 to have characteristics suitable for photographing by camera 8, when it is necessary. In the teaching operation, images captured by the camera 8 are sent through a cable 9 to an image processor (not shown) and the teaching points and related data including designation of type of motion of linear/circular arc are taught to the robot using the teaching software.

In the above described machining nozzle, there arises a problem in that the optical fiber 2 for supplying the laser beam has to be arranged at the lateral side of the machining nozzle 1 since the camera 8 is mounted at the upper side of the machining nozzle 1. Specifically, in the teaching operation, the optical fiber 2 connected to the lateral side of the machining nozzle 1 is moved with movement of the machining nozzle 1, so that an interference between the optical fiber 2 and the surroundings tends to occur. In order to surely avoid the interference, the operating range of the robot has to be greatly restricted to make it difficult to position the machining nozzle to a desired position/posture.

SUMMARY OF THE INVENTION

An object of the present invention is to provide a nozzle system for laser machining capable of easily performing a teaching operation of a three-dimensional path to a robot with an area of interference between the machining nozzle and surroundings in the teaching operation maintained substantially the same as that in an actual laser machining operation.

A nozzle system for laser machining of the present invention is for use in a state of being attached to an arm of a robot for performing a laser machining operation on an object and a teaching operation to the robot. The nozzle system may comprise a nozzle body unit having a lens system for converging a laser beam; an optical fiber supporting unit for supporting an optical fiber for supplying the laser beam to the nozzle body unit; and a camera supporting unit having a camera for capturing images of the object. According to one aspect of the present invention, the optical fiber supporting unit is attached to the nozzle body unit in performing the laser machining, and the camera supporting unit is attached to the nozzle unit in place of the optical fiber supporting unit in performing the teaching operation.

It is preferable to provide holding means for holding the optical fiber supporting unit or the camera supporting unit at a predetermined position with respect to the nozzle body unit detachably.

According to another aspect of the present invention, the camera supporting unit is substituted for the nozzle body unit to be positioned such that a machining point by the laser beam is covered by a visual field of the camera in performing the teaching operation. In this case, the camera supporting unit preferably has substantially the same dimension as the nozzle body unit.

The camera supporting unit may be positioned such that an optical axis of the camera coincides with an optical axis of the laser beam in performing the teaching operation.

The camera supporting unit may further have a light beam projector for projecting a patterned beam such as a spot beam and slit beams on the object.

According to the present invention, since the nozzle body unit and the optical fiber supporting unit are used in combination in performing an actual laser machining operation and the camera supporting unit having the camera dedicated for teaching is used in place of the optical fiber supporting unit and further the nozzle body unit in performing a teaching operation, an area of interference between the machining nozzle and surroundings in the teaching operation is maintained substantially the same as that in the laser machining and thus teaching operation to the robot can be easily performed with respect to a complicated three-dimensional object.

BRIEF DESCRIPTION OF THE DRAWINGS

FIGS. 2a and 2b are schematic diagrams of a nozzle system including substitution units for machining/teaching, according to a first embodiment of the present invention;

FIGS. 3a and 3b are schematic diagrams of a nozzle system including substitution units for machining/teaching, according to a second embodiment of the present invention;

FIG. 5 is a schematic cross-sectional view of a camera supporting unit with a spot beam projector according to a third embodiment of the present invention; and FIG. 6 is a schematic cross-sectional view of a camera supporting unit with a slit light projector according to a fourth embodiment of the present invention.

DETAILED DESCRIPTION OF THE PREFERRED EMBODIMENTS

Figure 1:
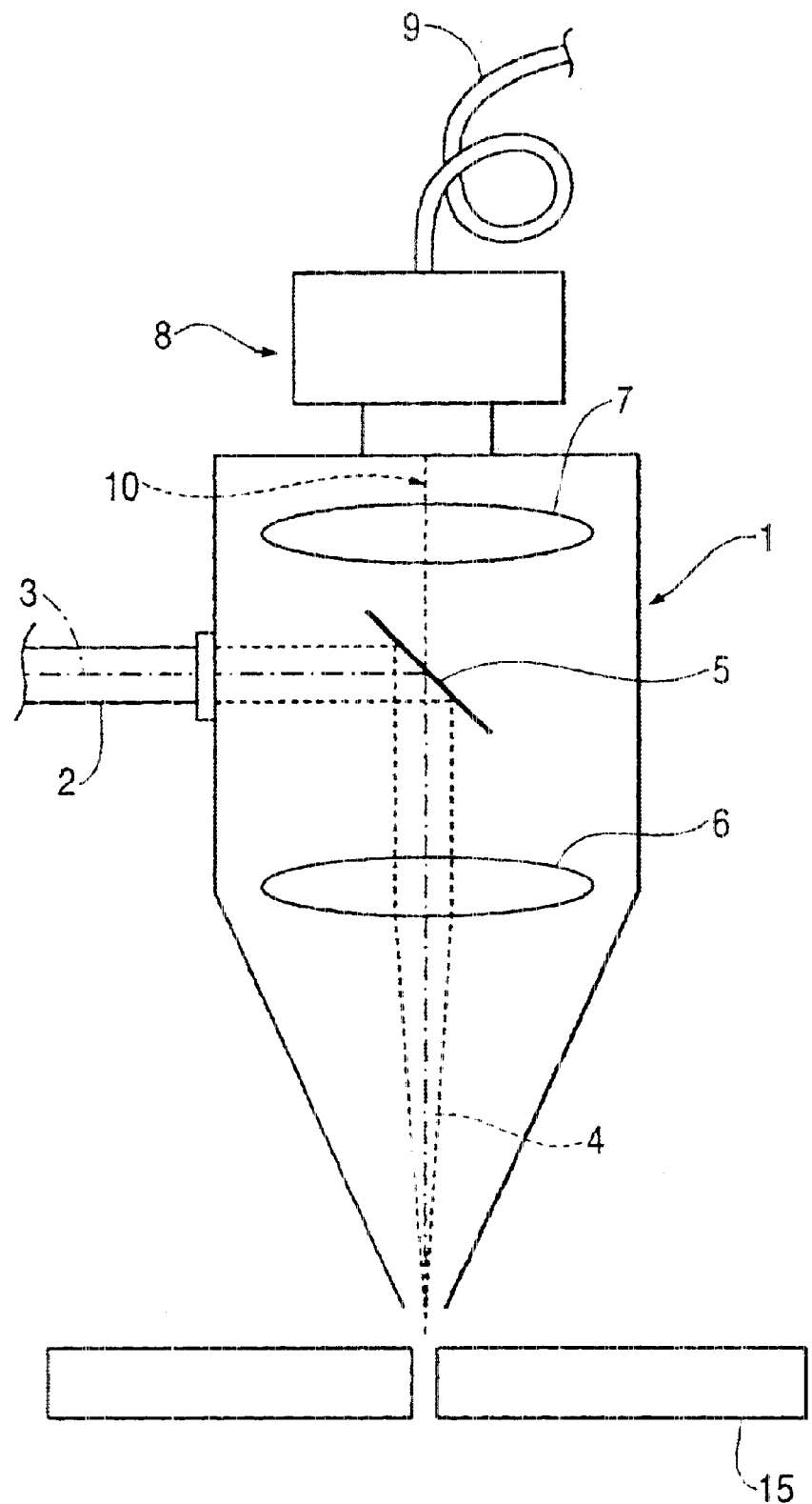
FIG. 1 is a schematic diagram of a machining nozzle according to prior art.

A nozzle system for laser machining as a combination of units for machining/teaching according to a first embodiment of the present invention will be described referring to FIGS. 2a and 2b.

For performing laser machining, an optical fiber supporting unit 100 is attached, e.g. by fitting, to a top side of a nozzle body unit 20 to form a laser machining nozzle, as shown in FIG. 2a. The nozzle body unit 20 has a lens system comprising lenses 21 and 22 for converging a laser beam. The optical fiber supporting unit 100 comprises a base 12 and an optical fiber connector 13 provided on the base 12 for connecting an optical fiber 14 for supplying a laser beam from a laser oscillator (not shown). The optical fiber connector 13 is arranged so that an optical axis of the laser beam introduced from the optical fiber 14 into the nozzle body unit 20 coincides with an optical axis of the lens system of lenses 21 and 22 in the state where the optical fiber supporting unit 100 is attached to the nozzle body unit 20.

After the nozzle body unit 20 or the optical fiber supporting unit 100 is attached to a distal end 11 of a robot arm, the laser machining is performed by irradiating the laser beam converged by the lens system on a workpiece, as an object of machining, from the machining nozzle while moving the machining nozzle along a machining path.

For performing a teaching operation to the robot, a camera supporting unit 200 shown in FIG. 2b is substituted for the optical fiber supporting unit 100 shown in FIG. 2a. The camera supporting unit 200 comprises a camera 26 such as CCD camera and an adapter 25 for supporting the camera 26. Specifically, the optical fiber supporting unit 100 is detached from the top side of the nozzle body unit 20 and the camera supporting unit 200 is attached to the upper side of the nozzle body unit 20 in place of the optical fiber supporting unit 100. In the state where the camera supporting unit 200 is attached to the nozzle body unit 20, the camera 26 is supported by the adapter 25 at a predetermined position where an optical axis of the camera 26 coincides with the optical axis of the lens system of lens 21 and 22. With this arrangement of the camera supporting unit 200 and the above-described arrangement of the optical fiber connector 13 of the optical fiber supporting unit 100, a relationship between a machining point by the laser beam in actual laser machining and a detected position on the workpiece in the teaching operation is simplified.

After the camera supporting unit 200 is attached to the nozzle body unit 20 with the camera 26 supported at the predetermined position and the nozzle body unit 20 or the camera supporting unit 200 is attached to the distal end 11 of the robot arm, the teaching operation is performed by sending image data captured by the camera 26 to an image processor (not shown) through a cable 27 for the camera, and analyzing the image data using the analysis software to obtain positions of teaching points, as described. The teaching operation using a visual sensor including the camera and the image processor and the analysis software is well known in the art and thus detailed description thereof is omitted.

In the above arrangement, it should be noted that the camera supporting unit 200 is used as a substitution of the optical fiber supporting unit 100 for the teaching operation, i.e., the optical fiber supporting unit 100 having the optical fiber connector 13 and the optical fiber 14 is detached from the nozzle body unit 20, and the camera supporting unit 200 having substantially the same dimension as the optical fiber supporting unit 100 is attached to the nozzle body unit 20 in place of the optical fiber supporting unit 100. With this arrangement of substitution of units, the optical fiber 2, which is required to be arranged at the lateral side of the machining nozzle 1 in the prior art as shown in FIG. 1, does not exist in the teaching operation and thus possibility of interference with surroundings is lowered and an operating range of the robot is not narrowed.

FIGS. 3a and 3b show a nozzle system for laser machining according to a second embodiment. According to the second embodiment, a camera supporting unit is substituted for the optical fiber supporting unit and the nozzle body unit for the teaching operation, whereas in the first embodiment, the camera supporting unit is substituted for the optical fiber supporting unit.

For performing laser machining, an optical fiber supporting unit 101 is attached, e.g. by fitting, to a top side of a nozzle body unit 30 to from a laser machining nozzle, as shown in FIG. 3a. The nozzle body unit 30 has a lens system comprising lenses 31 and 32 for converging a laser beam. The optical fiber supporting unit 101 comprises a base 40 and an optical fiber connector 41 provided on the base 40 for connecting an optical fiber 14 for supplying a laser beam from a laser oscillator (not shown). The optical fiber connector 41 is arranged so that an optical axis of the laser beam introduced from the optical fiber 14 into the nozzle body unit 30 coincides with an optical axis of the lens system of lenses 31 and 32 in the state where the optical fiber supporting unit 101 is attached to the nozzle body unit 30.

After the nozzle body unit 30 or the optical fiber supporting unit 101 is attached to a distal end 11 of a robot arm, the laser machining is performed by irradiating the laser beam converged by the lens system on a workpiece, as an object of machining, from the machining nozzle while moving the machining nozzle along a machining path.

For performing a teaching operation to the robot, a camera supporting unit 50 as shown in FIG. 3b is used in place of the nozzle body unit 30 and the optical fiber supporting unit 101. The camera supporting unit 50 has a dimension equivalent to that of the nozzle body unit 30 and supports a camera 51 at a predetermined position inside. Fitting, screwing or other supporting structure may be adopted for supporting the camera in the camera supporting member 50.

The camera supporting unit 50 is a kind of a dummy nozzle which is not used for actual machining and thus the lens system (lenses 31, 32) for converging the laser beam is not necessary. A lens system for adjusting optical characteristics of the camera 51 may be provided occasionally.

In the state where the camera supporting unit 50 is attached to the distal end 11 of the robot arm, the camera 51 is supported at a predetermined position where an optical axis of the camera 51 coincides with the optical axis of the lens system of lens 31 and 32. Also, the camera supporting unit 50 is positioned such that a machining point by the laser beam is covered by a visual field of the camera 51 in performing the teaching operation. With this arrangement of the camera supporting unit 50 and the above-described arrangement of the optical fiber connector 41 of the optical fiber supporting unit 101, a relationship between a machining point by the laser beam in actual laser machining and a detected position on the workpiece in the teaching operation is simplified.

After the camera supporting unit 50 is attached to the distal end 11 of the robot arm with the camera 51 supported at the predetermined position, the teaching operation is performed by sending image data captured by the camera 51 to the image processor through a cable 52 for the camera, and analyzing the image data using the analysis software to obtain positions of teaching points, as described. The teaching operation using a visual sensor including the camera and the image processor and the analysis software is well known in the art and thus detailed description thereof is omitted.

In the above arrangement, it should be noted that the camera supporting unit 50 for supporting the camera 51 is used as a substitution of the nozzle body unit 30 for the teaching operation, i.e., the nozzle body unit 30 and the optical fiber supporting unit 101 having the optical fiber connector 41 and the optical fiber 14 are detached from the distal end 11 of the robot arm, and the camera supporting unit (dummy nozzle) 50 having substantially the same dimension as the nozzle body unit 30 is attached to the distal end 11 of the robot arm in place of the nozzle body unit 30. With this arrangement of substitution of units, the optical fiber 2, which is required in the prior art as shown in FIG. 1, does not exist in the teaching operation and thus possibility of interference with surroundings is lowered and an operating range of the robot is not narrowed.

It is desirable to perform the exchange of the units of the machining nozzle for the machining operation or the teaching operation in a short time. An arrangement for achieving a quick exchange of the units will be described referring to FIG. 4. The arrangement shown in FIG. 4 is applied to the nozzle system according to the first embodiment.

Figure 4:
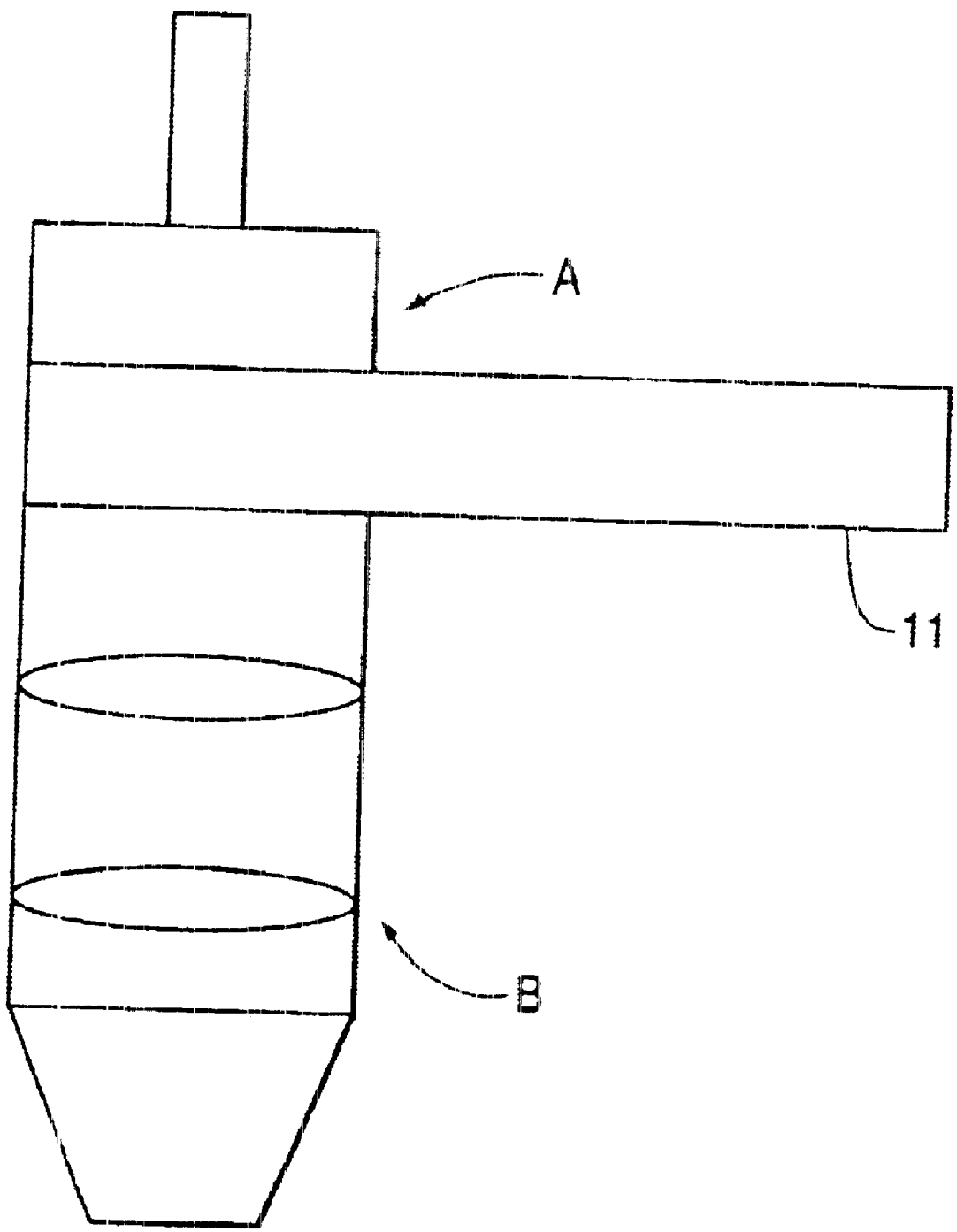
FIG. 4 is a schematic diagram of units A and B attached to a robot arm.

Since the optical fiber supporting unit 100 for the machining operation and the camera supporting unit 200 for the teaching operation is compatible, as described with regard to the first embodiment, a common reference symbol A is assigned for representing the optical fiber supporting unit 100 or the camera supporting unit 200 in FIG. 4. A reference symbol B represents the nozzle body unit 20.

For performing the laser machining operation, the machining nozzle is constituted by the unit A of the optical fiber supporting unit 100 and the unit B of the nozzle body unit 20. For performing the teaching operation, the machining nozzle is constituted by the unit A of the camera supporting unit 200 and the unit B of the nozzle body unit 20.

The unit A and the unit B are attached to and detached from the distal end 11 of the robot arm at predetermined positions by means of appropriate attachment/detachment mechanism. With this arrangement, when a problem occurs in the unit A or the unit B, the unit in problem can be replaced with new one in a shot time Further, a lens system for commercial cameras may be used in replace of the lens system for converging the laser beam in the unit B to be suitable for capturing images by the camera 26 of the camera supporting unit 200. In this case, magnification of the lens system can be set and selected as the occasion demands.

For holding the units A and B at the distal end 11 of the robot arm, a bayonet mount which is commonly used for a single-lens reflex camera may be adopted. In this case, the units A and B are firmly held at predetermined positions on the distal end 11 of the robot arm, being pressed by springs of the bayonet mount having three claws.

Alternatively, the units A and B may be mounted at the predetermined positions using a positioning pin to prevent a displacement of the optical axis possibly caused by displacement of the units.

In the above described embodiments, the cameras 26 and 51 capture images of an object by light reflection without specific projection of light. A three-dimensional visual sensor using projection of a patterned light such as spot light or slit light is generally used for the three-dimensional measurement and such sensor may be adopted in the laser machining nozzle of the present invention. Third and fourth embodiments utilizing the three-dimensional visual sensor using the patterned light will be described referring to FIGS. 5 and 6.

These third and fourth embodiments are modification of the second embodiment in which the nozzle body unit 30 and the optical fiber supporting unit 101 is replaced by the camera supporting unit 50 for the teaching operation. In these third and fourth embodiments, a camera/projector supporting unit is attached to a distal end of a robot arm in place of the camera supporting unit 50 shown in FIG. 3b.

In the third embodiment as shown in FIG. 5, a camera/projector supporting unit 55 as a dummy nozzle for teaching operation has a supporting member 56 provided at top side thereof for supporting a camera 51 and also a spot light projector 60 using a semiconductor laser, LED, etc. at predetermined positions. The camera/projector supporting unit 55 has a dimension equivalent to the dimension of the camera supporting unit 50 and thus the dimension of the nozzle body unit 30 as shown in FIGS. 3a and 3b.

In the teaching operation, a spot light beam 62 is projected from the spot light projector 60 on a workpiece (not shown) to form a light spot 63, as the occasion demands. When the light spot 63 is formed on the workpiece at a predetermined teaching position, an image of the workpiece including an image of the light spot is captured by the camera 51 and sent to the image processor through a cable 52 to determine a three-dimensional position of the light spot 63 through the analysis by the image processor. The three-dimensional sensor using the spot light beam is well known in the art and thus detailed description thereof is omitted.

In the fourth embodiment shown in FIG. 6, a camera/projector supporting unit 70 as a dummy nozzle for teaching operation has a supporting member 71 provided at top side thereof for supporting a camera 51 and also a slit light projectors 80 using a light source of a semiconductor laser, LED, etc. and a cylindrical lens, at predetermined positions. The camera/projector supporting unit 70 has a dimension equivalent to the dimension of the camera supporting unit 50 and thus the dimension of the nozzle body unit 30 as shown in FIGS. 3a and 3b.

In the teaching operation, slit light beams 82, 83 are projected from the slit light projectors 80 on a workpiece to form two light lines on the workpiece, as the occasion demands. When a crossing point of the two light lines is formed at a predetermined teaching position, an image of the workpiece including an image of two light lines is captured by the camera 51 and sent to the image processor through cables 84 and 85 to determine a three-dimensional positional of the crossing point through analysis by the image processor. The three-dimensional sensor using the slit light is well known in the art and thus detailed description thereof is omitted.

According to the present invention, a possibility of interference of the machining nozzle with surroundings in the teaching operation is lowered and an operating range of the robot to which the machining nozzle is attached is not narrowed. Thus, a complicated three-dimensional laser machining can be easily taught to a robot to which the machining nozzle of the present invention is attached. Further, since elements for use in the teaching operation, which is not necessary in the laser machining, do not exist in the machining nozzle attached to the distal end of the robot in the laser machining, weight of elements on the distal end of the robot is reduced to contribute precision of machining path and high speed motion of the machining nozzle.

What is claimed is:

1. A nozzle system for laser machining for use in a state of being attached to an arm of a robot for performing a laser machining operation on an object and a teaching operation to the robot, comprising:

a nozzle body unit having a lens system for converging a laser beam;

an optical fiber supporting unit for supporting an optical fiber for supplying the laser beam to said nozzle body unit, said optical fiber supporting unit being attached to said nozzle body unit in performing the laser machining; and a camera supporting unit having a camera for capturing images of the object, said camera supporting unit being attached to said nozzle unit in place of said optical fiber supporting unit in performing the teaching operation.

2. A nozzle system for laser machining according to claim 1, further comprising holding means for holding said optical fiber supporting unit or said camera supporting unit at a predetermined position with respect to said nozzle body unit detachably.

3. A nozzle system for laser machining for use in a state of being attached to an arm of a robot for performing a laser machining operation on an object and a teaching operation to the robot, comprising:

a nozzle body unit having a lens system for converging a laser beam;

an optical fiber supporting unit for supporting an optical fiber for supplying the laser beam to said nozzle body unit, said optical fiber supporting unit being attached to said nozzle body unit in performing the laser machining; and a camera supporting unit having a camera for capturing images of the object, said camera supporting unit being substituted for said nozzle body unit to be positioned such that a machining point by the laser beam is covered by a visual field of the camera in performing the teaching operation.

4. A nozzle system for laser machining according to claim 3, wherein said camera supporting unit is positioned such that an optical axis of the camera coincides with an optical axis of the laser beam in performing the teaching operation.

5. A nozzle system for laser machining according to claim 3, wherein said camera supporting unit further includes a light beam projector for projecting a patterned beam on the object.

6. A nozzle system for laser machining according to claim 5, wherein said patterned beam comprises a spot beam.

7. A nozzle system for laser machining according to claim 5, wherein said patterned beam comprises a slit beam.

* * * * *